(12) United States Patent
Johnson (10) Patent No.: US 10,509,828 B1
(45) Date of Patent: Dec. 17, 2019

(54) SYSTEM AND METHOD FOR DISPLAYING SOCIAL MEDIA ACTIVITY

(71) Applicant: Waar, LLC, Seattle, WA (US)

(72) Inventor: Brandon Robert Johnson, Puyallup, WA (US)

(73) Assignee: Waar, LLC, Seattle, WA (US)

( * ) Notice: Subject to any disclaimer, the term of this patent is extended or adjusted under 35 U.S.C. 154(b) by 0 days.

(21) Appl. No.: 16/440,968

(22) Filed: Jun. 13, 2019

(51) Int. Cl.
| | |
|---|---|
| *G06F 17/30* | (2006.01) |
| *G06F 16/9035* | (2019.01) |
| *G06F 16/9038* | (2019.01) |
| *G06F 16/909* | (2019.01) |
| *G06F 16/903* | (2019.01) |
| *G06T 11/00* | (2006.01) |
| *G06Q 50/00* | (2012.01) |

(52) U.S. Cl.
CPC ........ *G06F 16/9035* (2019.01); *G06F 16/909* (2019.01); *G06F 16/9038* (2019.01); *G06F 16/90344* (2019.01); *G06T 11/001* (2013.01); *G06Q 50/01* (2013.01)

(58) Field of Classification Search
CPC ....................................................... H04W 4/21
USPC .............. 707/705, 706; 455/450; 706/46, 50
See application file for complete search history.

(56) References Cited

U.S. PATENT DOCUMENTS

| | | | |
|---|---|---|---|
| 2010/0024042 A1* | 1/2010 | Motahari .............. | G06F 21/577 726/26 |
| 2015/0201304 A1* | 7/2015 | Tasdemiroglu ....... | H04W 4/029 455/456.3 |

* cited by examiner

*Primary Examiner* — Baoquoc N To
(74) *Attorney, Agent, or Firm* — Michael D. Eisenberg (57) ABSTRACT

A method and system of managing and organizing social media content or posts by geographical origin and by the gender of the authors of the social media posts.

16 Claims, 9 Drawing Sheets

SYSTEM AND METHOD FOR DISPLAYING SOCIAL MEDIA ACTIVITY

TECHNICAL FIELD

This invention relates to methods and system for operating features on social medial platforms.

BACKGROUND OF THE INVENTION

Current social media platforms do not give users much control over content defined by geography or other parameters such as gender. Typically, they only display content based on a group or persons being followed. The present invention addresses these needs.

BRIEF SUMMARY OF EMBODIMENTS OF THE INVENTION

The present invention lets the user build their social media life the way they want it. One of the ways the present invention accomplishes this is via a pindrop feature where users can select a location anywhere in the world to view social media activity in the selected location, both real-time and historical data. For example, if a sports game takes place at a local stadium, users can select the location of the stadium, and see all the real-time posts from that location. The present invention also displays an activity map which differentiates posts published by male users from posts published by female users, and therefore enables the user to view social media activity by gender.

According to one embodiment of the invention,

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 3:
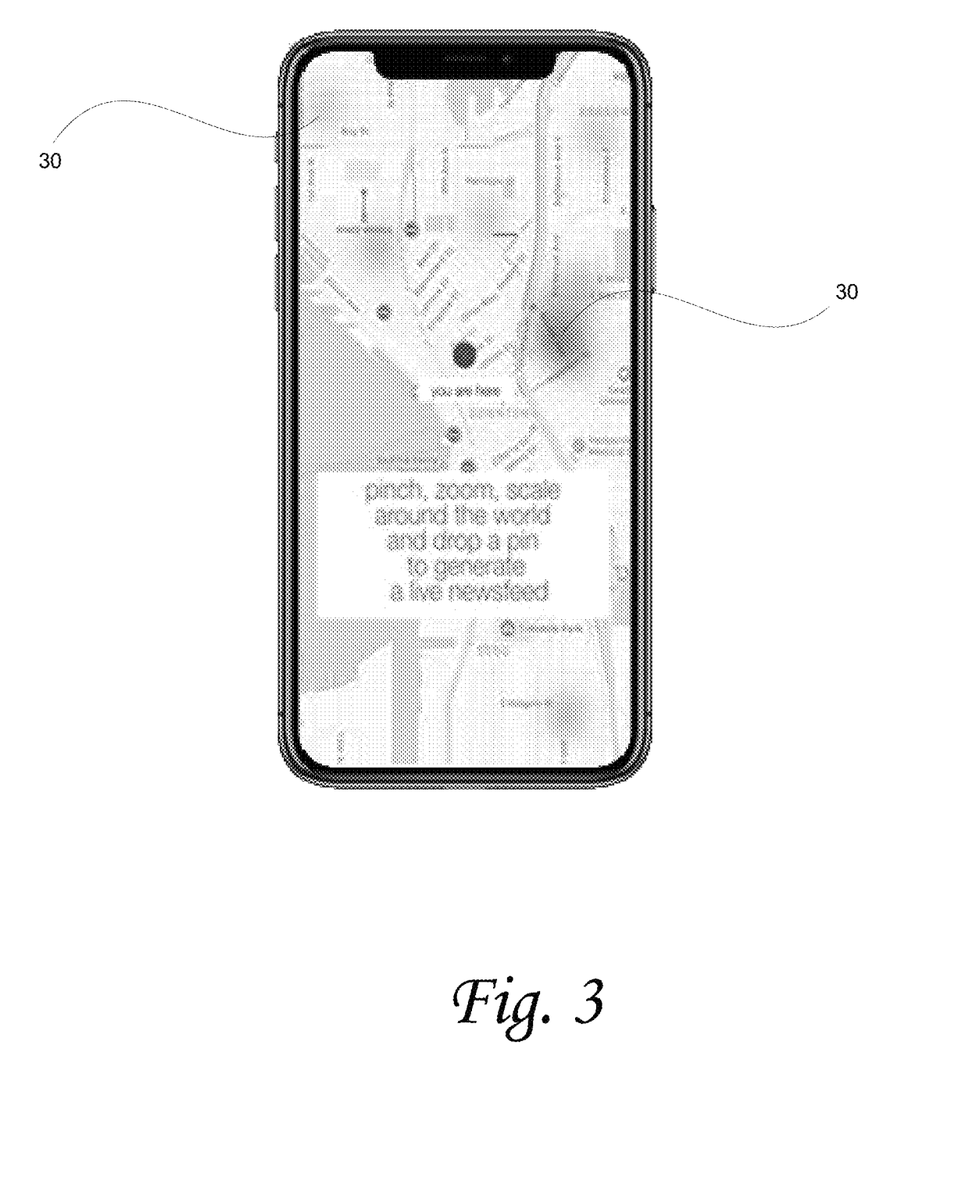
FIG. 3 is a screen view of heat map.
Figure 4:
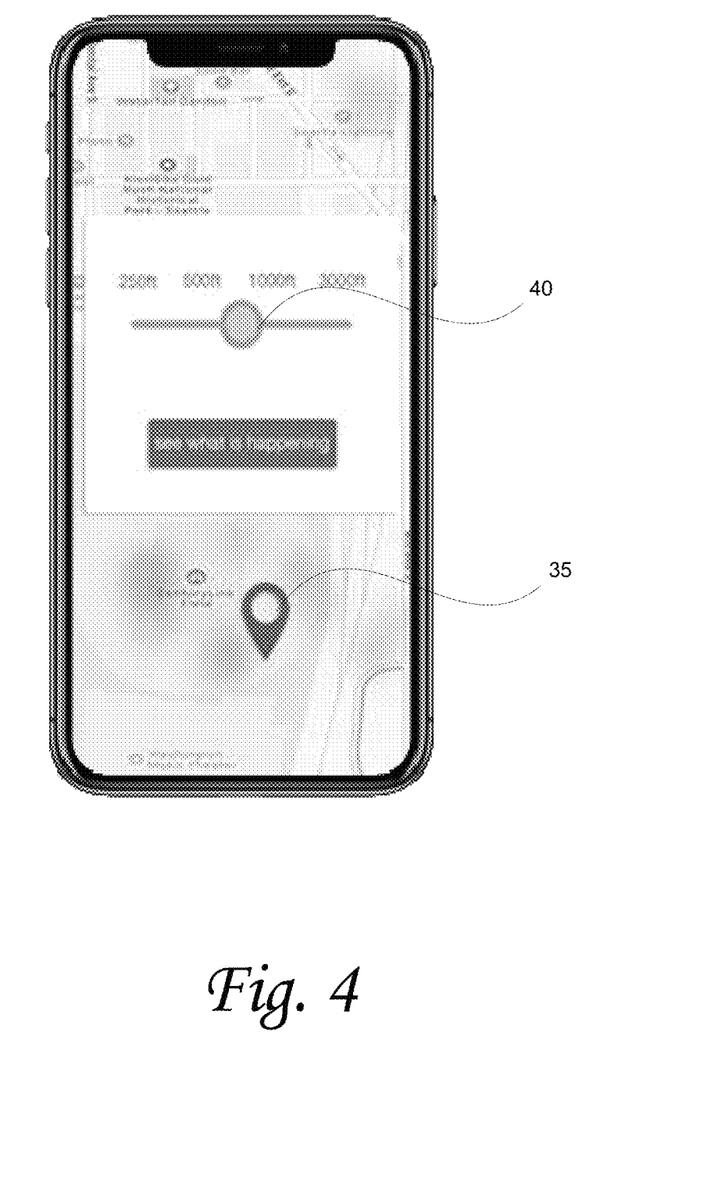
FIG. 4 is a screen view prompting a user to input a distance for determining a heat map.
Figure 7:
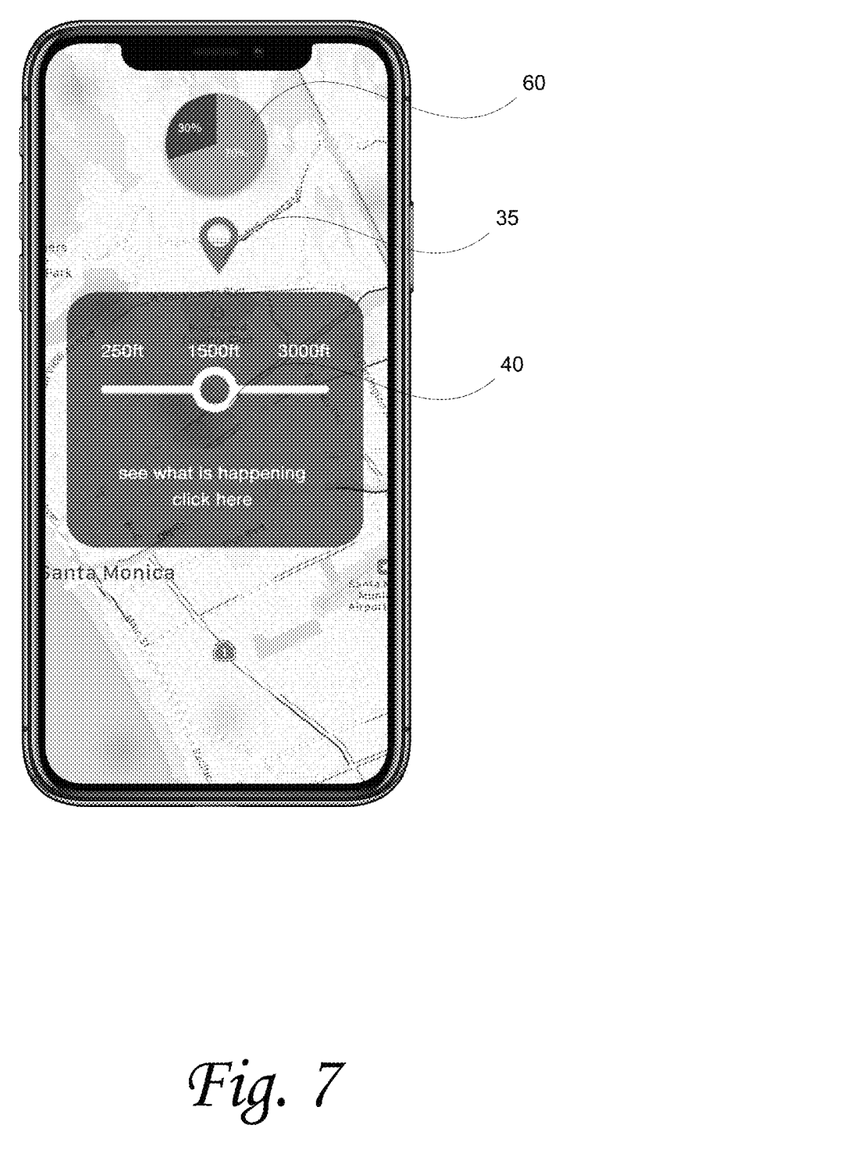
FIG. 7 is a screen view prompting a user to input a distance for determining a heat map and also displaying the percentage of males and females in the area displayed.

The present invention provides a system and method for displaying social media activity, in the form of a heat map overlaid over a digital map formed on an electronic display. The map may be a road map, an area map, a physical map, a thematic map, an economic or resource map or other maps. The method may be carried out on a system comprising a processor and a memory in communication with the processor, having non-transitory computer readable medium having instructions stored thereon, that when executed by the processor, cause the processor to carry out steps of the method. In a variant, referring to FIG. 1, the method 200 comprises prompting a user to select a location 205. Referring to FIGS. 3 and 4, selecting a location may comprise a user dropping a pin on the map, by touching the desired location on a touch screen displaying a map. Alternatively, selecting a desired location may comprise the user entering a city, town, state, country, post code, neighborhood or other geographical designation as an input. In step 208, once the location is received by the system, at least one social media system or outlet is searched to compile a list of public social media posts published from a geographical region that is within a certain distance or range, for example, 250 ft-3000 ft of the selected location over a predetermined time period. Referring to FIGS. 4 and 7, the predetermined distance may be selected by the user, for example using a slider 40. The time period could be historical time periods up to a number of minutes, hours, days, weeks or other time periods extending into the past. In some embodiments of the present invention, the time period is also selectable by the user.

Figure 6:
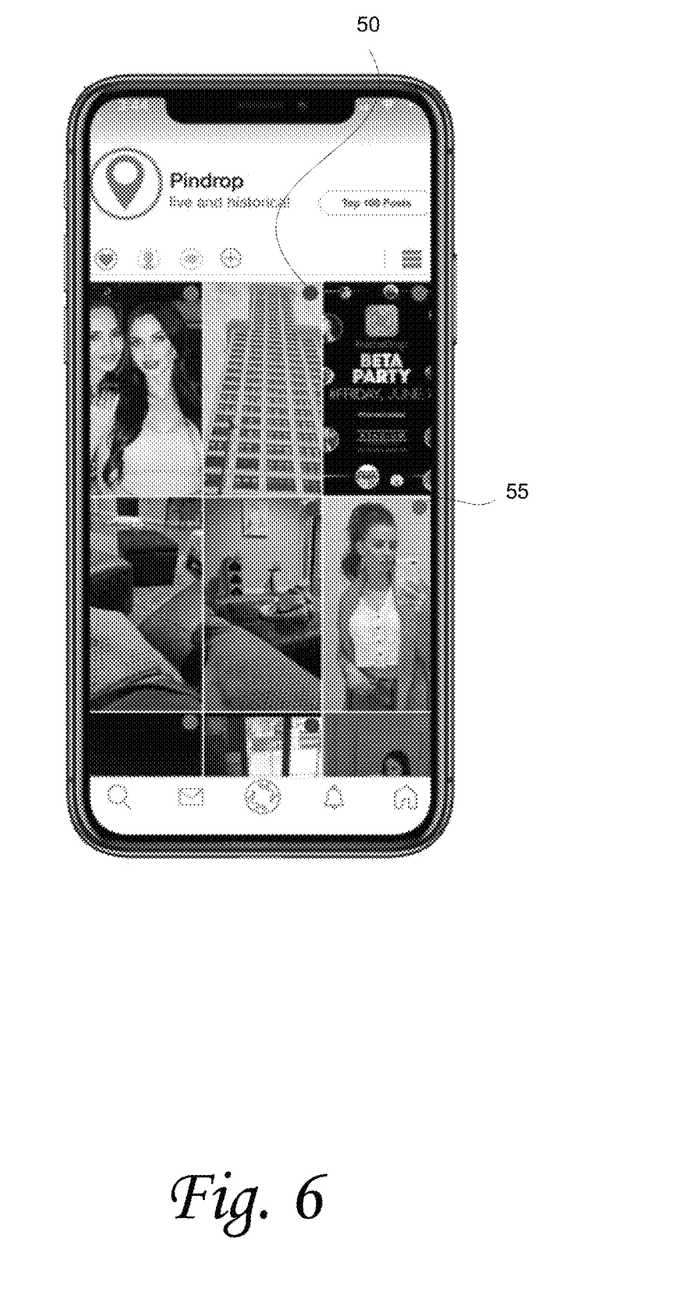
FIG. 6 is a screen view displaying social media posts from a defined geographic area and color coded based on the gender of the users.

In step 210, referring to FIG. 6, posts by male users in the list are designated and displayed with a first color 50, for example, blue, and posts by female users in the list are designated and displayed with a second color 55, for example, pink. In step 215, a map of the region is displayed. In step 220, an overlay over the map is displayed. Optionally, posts by transgender male users in the list are designated and displayed with a third color, for example, purple, and posts by transgender female users in the list are designated and displayed with a fourth color, for example, green. The overlay indicates social media activity by male users and female users by marking a position from which each post in the list was published.

Figure 8:
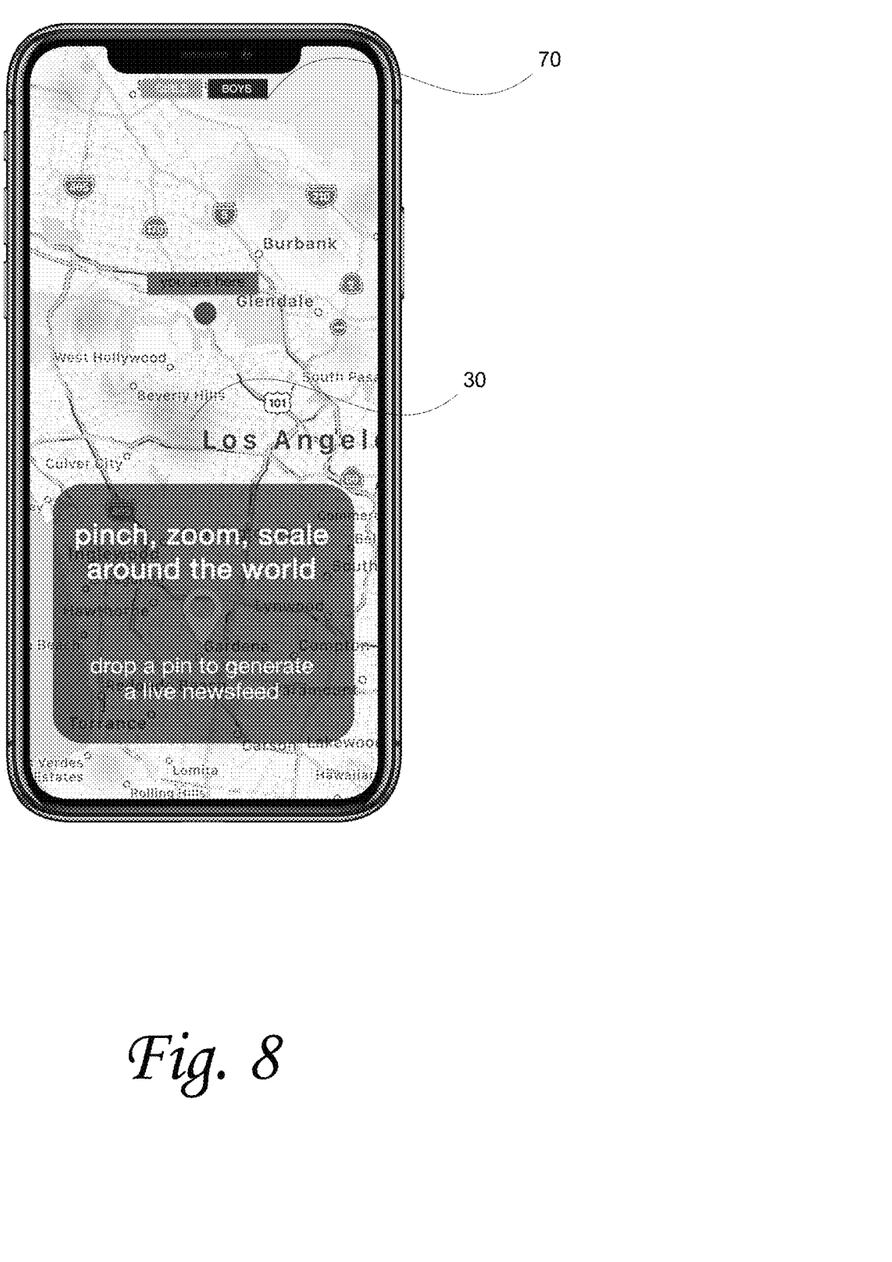
FIG. 8 is a screen view of heat map with a legend for male and female colors.

For example, when more than a predetermined number of posts are published within a first distance from each other, in step 225 a blob 30 connecting the positions of the posts is generated, for example, as shown in FIGS. 3 and 8. FIG. 8 shows an optional legend 70 for the colors assigned to the genders. In step 230 each pixel of the blob is colored by blending the first color and second color according to a weighted sum, such that pixels closer to positions of posts published by male users have a color closer to the first color and pixels closer to positions of posts published by female users have a color closer to the second color. In a variant, the blob 30 has an amount of transparency so that the map underneath it is visible.

In a variant, the weighted sum is a sum of a first indicator indicative of the first color times a first weight and a second indicator indicative of the second color times a second weight. The first and second indicators may be, for example, RGB vectors, in which the first and second colors are represented as combinations of Red, Green, and Blue. Other indicators may be CMYK, HSL, and HSV, for example. The first weight depends on a distance of the pixel from all posts in the blob published by male users and the second weight depends on a distance of the pixel from all posts in the blob published by female users. In an optional embodiment, adding the first weight to the second weight yields 1.

Figure 1:
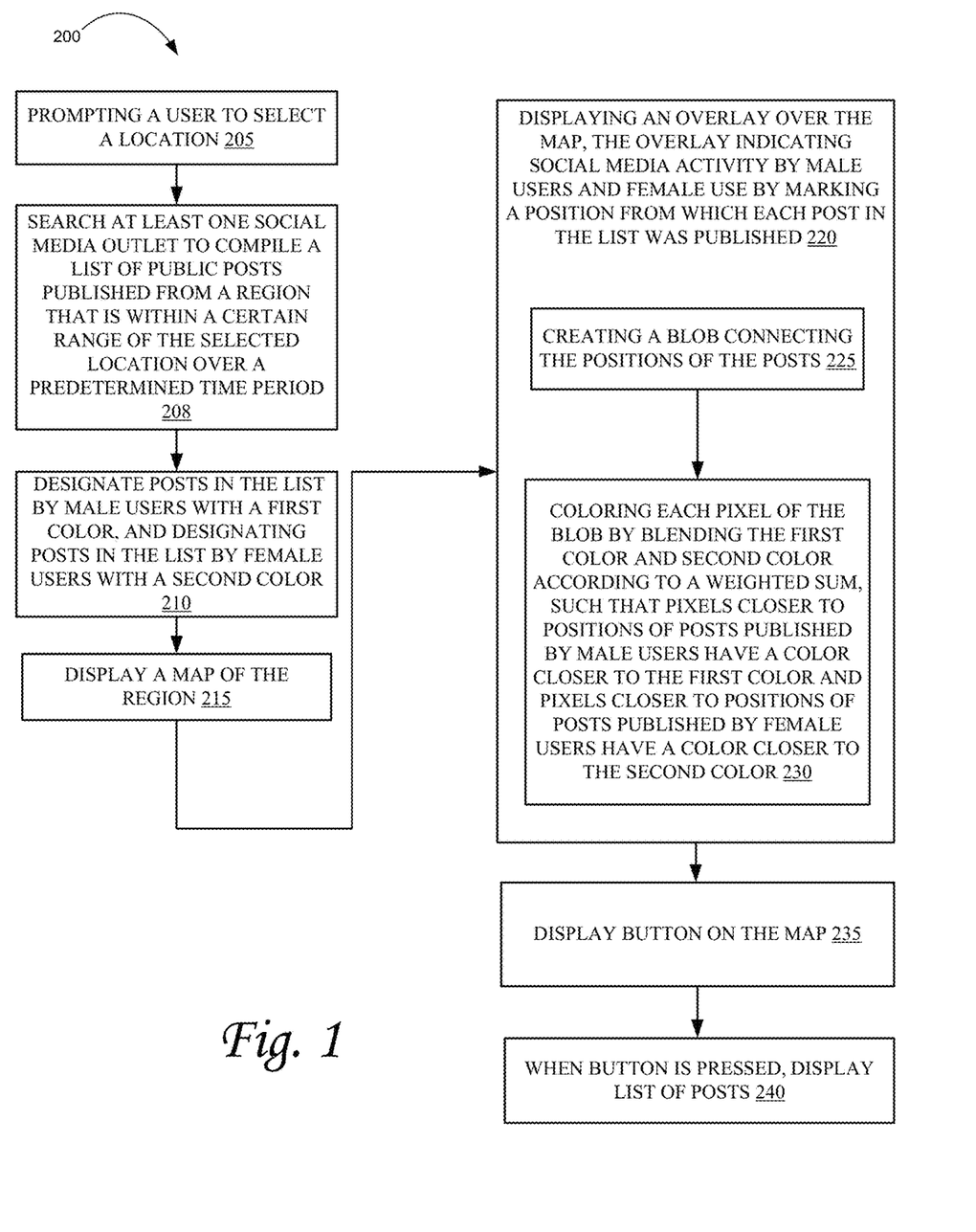
FIG. 1 is flow chart of one variant of the method of generating a heat map of social media posts color coded based users' genders.
Figure 5:
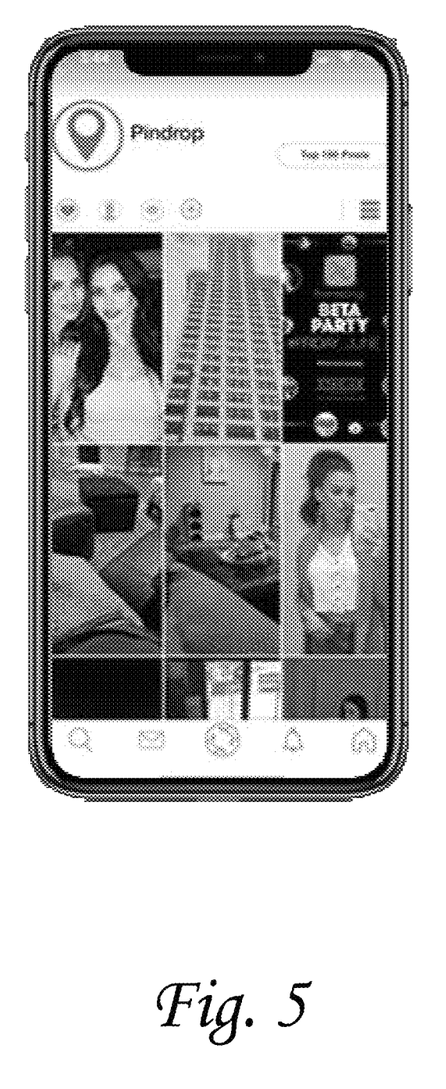
FIG. 5 is a screen view displaying social media posts from a defined geographic area.
Figure 9:
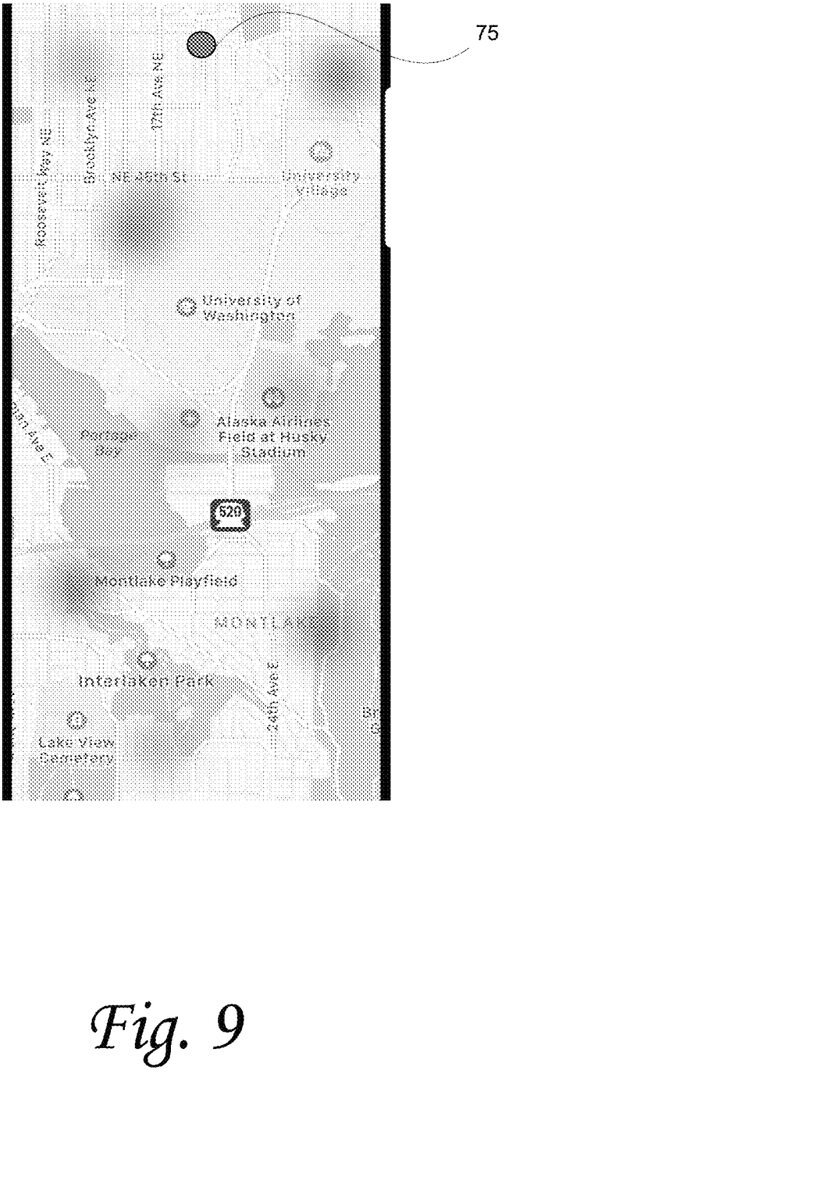
FIG. 9 is a screen view of generated heat map overlaid on to a map, with a button for switching to a screen displaying list of social media posts in FIG. 6.

In some embodiments of the present invention, referring to FIG. 1, in step 235 a button 70 is also displayed near or on the map, as shown in FIG. 9. When the button is pressed, the list of posts is displayed at 240, for example, as shown in FIG. 5 or FIG. 6. The list of posts may be displayed as a list of images, each image being indicative of the respective post. For example, if the post contained a picture, the image indicative of the post may be part of the picture of the whole picture. In some embodiments of the present invention, selecting (touching or clicking on) the image causes the full post to be displayed, either at full screen mode or as a pop-up above the list of posts. In a variant each image is marked by an icon (50, 55) indicative of whether the post was published by a male user or a female user. For example, the icon 50 to indicate that post was published by a male user may include a stylized image of a man, a symbol indicative of the male gender, a geometrical figure filled with the first color, or a frame of the first color around the image. Similarly, the icon 55 to indicate that post was published by a female user may include a stylized image of a woman, a symbol indicative of the female gender, a geometrical figure filled with the second color, or a frame of the second color around the image.

In another variant, the user is prompted to select a location, which comprises at least one of: displaying a first map of the area around the user and prompting the user to select a location on the map, or prompting the user to write a name of a venue.

Figure 2:
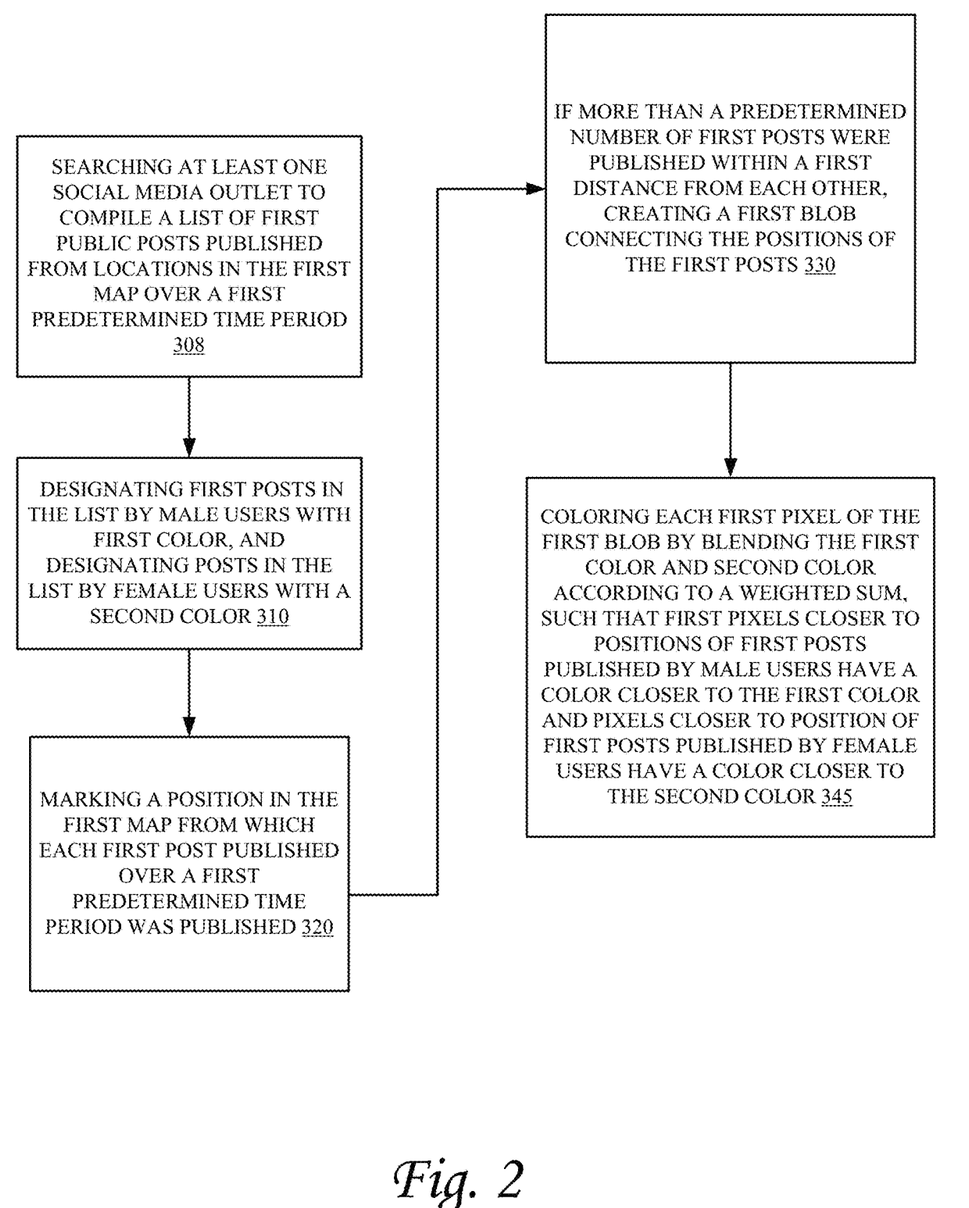
FIG. 2 is a flow chart of another variant of the method of generating a heat map of posts color coded based on users' genders.

In a further variant, referring to FIG. 2, the first map includes at least a first overlay indicating social media activity by male users and female users. In step 308, the first overlay is generated by searching at least one social media service or outlet to compile a list of first public posts published from locations in the first map over a first predetermined time period. In step 310 first posts in the list by male users are designated with the first color, and first posts in the list by female users are designated with the second color. In step 320, a position in the first map is marked from which each first post published over a first predetermined time period was published. When more than a predetermined number of first posts are published within a first distance from each other, in step 330, a first blob connecting the positions of the first posts is generated. In step 345, each first pixel of the first blob is colored by blending the first color and second color according to a weighted sum, such that first pixels closer to positions of first posts published by male users have a color closer to the first color and first pixels closer to position of first posts published by female users have a color closer to the second color.

In yet a further variant of the method, after prompting the user to select the location and before searching the at least one social media outlet, the method comprises prompting the user to select a range around the location, for viewing social media activity. The certain range is the range selected by the user.

Data is collected on various points via user activity as the users provide data to the system by participating in various ways, such as tagging a location other forms of metadata, like time, mood, etc. This data is displayed visually and overlaid on the map to show variations and comparisons relative to the corresponding data, in the form of two or more contrasting colors, which when overlapped displays another color that denotes the combination of the original colors.

The system may use a single tool to achieve this, or multiple tools in conjunction with one another. In either case, data is extracted from a social media app in one form, for example, location, activity, emotion, and geolocated to a specific point. The data is then fed to services such as Google Maps, Javascript API, which layer the relevant data onto a heatmap layer and displays latitude/longitude information therein via an array.

Data may be displayed as single points or combined with other points with factors such as density and recency directly impacting the visualization of the data and creating variations in intensity, gradient, dissipation, opacity, radius, etc, to relationally convey meaning and information. A key is used to give context to the visualization and help users understand what the heatmap indicates simply and efficiently.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for displaying social media activity, the method comprising:
  i. prompting a user to select a location;
  ii. searching at least one social media outlet to compile a list of public posts published from a region that is within a certain range of the selected location over a predetermined time period;
  iii. designating posts in the list by male users with a first color, and designating posts in the list by female users with a second color;
  iv. displaying a map of the region;
  v. displaying an overlay over the map, the overlay indicating social media activity by male users and female users, by:
    marking a position from which each post in the list was published;
    if more than a predetermined number of posts were published within a first distance from each other, generating a blob connecting the positions of the posts, and if more than the predetermined number is not met, no blob is generated connecting those posts;
    coloring each pixel of the blob by blending the first color and second color according to a weighted sum, such that pixels closer to positions of posts published by male users have a color closer to the first color and pixels closer to positions of posts published by female users have a color closer to the second color.

2. The method of claim 1, wherein the weighted sum is a sum of a first indicator indicative of the first color times a first weight and a second indicator indicative of the second color times a second weight, wherein first weight depends on a distance of the pixel from all posts in the blob published by male users and the second weight depends on a distance of the pixel from all posts in the blob published by female users.

3. The method of claim 2, wherein adding the first weight to the second weight yields 1.

4. The method of claim 1, wherein prompting the user to select a location comprises at least one of:
  displaying a first map of the area around the user and prompting the user to select a location on the map;
  prompting the user to write a name of a venue.

5. The method of claim 4, wherein the first map includes at least a first overlay indicating social media activity by male users and female users, the first overlay being generated by:
  searching at least one social media outlet to compile a list of first public posts published from locations in the first map over a first predetermined time period;
  designating first posts in the list by male users with the first color, and designating first posts in the list by female users with the second color;
  marking a position in the first map from which each first post published over a first predetermined time period was published;
  if more than a predetermined number of first posts were published within a first distance from each other, creating a first blob connecting the positions of the first posts;
  coloring each first pixel of the first blob by blending the first color and the second color according to a weighted sum, such that first pixels closer to positions of first posts published by male users have a color closer to the first color and first pixels closer to position of first posts published by female users have a color closer to the second color.

6. The method of claim 1, comprising, after prompting the user to select the location and before searching the at least one social media outlet, prompting the user to select a range around the location, for viewing social media activity;
  wherein the certain range is the range selected by the user.

7. The method of claim 1, comprising, near the map displaying a button, which when pressed, causes the list of the posts to be displayed, wherein each post is marked by the first color if it was published by a male user or the second color if it was published by a female user.

8. The method of claim 7, wherein each post in the list is displayed as an image used in the post.

9. A system for displaying social media activity, comprising a processor and a memory in communication with the processor, having a non-transitory computer readable instructions stored thereon, that when executed by the processor, cause the processor to:
  i. prompt a user to select a location;
  ii. search at least one social media outlet to compile a list of public posts published from a region that is within a certain range of the selected location over a predetermined time period;
  iii. designate posts in the list by male users with a first color, and designating posts in the list by female users with a second color;
  iv. display a map of the region;
  v. display an overlay over the map, the overlay indicating social media activity by male users and female users, by marking a position from which each post in the list was published;
  vi. generate a blob connecting the positions of the posts when more than a predetermined number of posts are published within a first distance from each other, and if more than the predetermined number is not met, no blob is generated connecting those posts;

vii. color each pixel of the blob by blending the first color and second color according to a weighted sum, such that pixels closer to positions of posts published by male users have a color closer to the first color and pixels closer to positions of posts published by female users have a color closer to the second color.

10. The system of claim 9, wherein the weighted sum is a sum of a first indicator indicative of the first color times a first weight and a second indicator indicative of the second color times a second weight, wherein first weight depends on a distance of the pixel from all posts in the blob published by male users and the second weight depends on a distance of the pixel from all posts in the blob published by female users.

11. The system of claim 10, wherein adding the first weight to the second weight yields 1.

12. The system of claim 9, wherein prompt the user to select a location comprises at least one of:
 displaying a first map of the area around the user and prompting the user to select a location on the map;
 prompting the user to write a name of a venue.

13. The system of claim 12, wherein the first map includes at least a first overlay indicating social media activity by male users and female users, the first overlay being generated by the processor and the processor being configured to:
 search at least one social media outlet to compile a list of first public posts published from locations in the first map over a first predetermined time period;
 designate first posts in the list by male users with the first color, and designating first posts in the list by female users with the second color;
 mark a position in the first map from which each first post published over a first predetermined time period was published;
 generate a first blob connecting the positions of the first posts when more than a predetermined number of first posts were published within a first distance from each other;
 color each first pixel of the first blob by blending the first color and the second color according to a weighted sum, such that first pixels closer to positions of first posts published by male users have a color closer to the first color and first pixels closer to position of first posts published by female users have a color closer to the second color.

14. The system of claim 9, wherein the instructions cause the processor to, after prompting the user to select the location and before searching the at least one social media outlet, prompt the user to select a range around the location, for viewing social media activity;
 wherein the certain range is the range selected by the user.

15. The system of claim 9, wherein the instructions cause the processor to display a button, which when pressed, causes the processor to display the list of the posts and mark each post by the first color if it was published by a male user or the second color if it was published by a female user.

16. The method of claim 15, wherein each post in the list is displayed as an image used in the post.

* * * * *